(12) United States Patent
Ritschel et al.

(10) Patent No.: US 8,225,650 B2
(45) Date of Patent: Jul. 24, 2012

(54) MEASUREMENT OF TORQUE UNIFORMITY IN MULTIPLATE CLUTCHES

(75) Inventors: Michael Ritschel, Kronau (DE); Ludwig Moch, Kronau (DE); Michael Schäfer, Ketsch (DE)

(73) Assignee: BorgWarner Inc., Auburn Hills, MI (US)

( * ) Notice: Subject to any disclaimer, the term of this patent is extended or adjusted under 35 U.S.C. 154(b) by 397 days.

(21) Appl. No.: 12/086,987

(22) PCT Filed: Dec. 20, 2006

(86) PCT No.: PCT/EP2006/012332
§ 371 (c)(1),
(2), (4) Date: May 7, 2010

(87) PCT Pub. No.: WO2007/076935
PCT Pub. Date: Jul. 12, 2007

(65) Prior Publication Data
US 2010/0275681 A1 Nov. 4, 2010

(30) Foreign Application Priority Data

Dec. 23, 2005 (DE) .......................... 10 2005 062 413
Dec. 20, 2006 (DE) .......................... 10 2006 060 922

(51) Int. Cl.
*G01M 13/02* (2006.01)

(52) U.S. Cl. .................................................. 73/115.04

(58) Field of Classification Search ............... 73/114.15, 73/115.02, 115.04
See application file for complete search history.

(56) References Cited

U.S. PATENT DOCUMENTS

| 3,913,395 | A | * | 10/1975 | Brooks | 73/115.04 |
|---|---|---|---|---|---|
| 4,356,724 | A | * | 11/1982 | Ayoub et al. | 73/114.14 |
| 4,941,347 | A | * | 7/1990 | Iijima et al. | 73/116.02 |
| 4,998,437 | A | * | 3/1991 | Magoolaghan | 73/115.02 |
| 5,038,601 | A | | 8/1991 | Renneker | |
| 5,207,092 | A | * | 5/1993 | Bruno | 73/115.04 |
| 5,847,272 | A | * | 12/1998 | Schneider et al. | 73/115.02 |
| 5,982,280 | A | | 11/1999 | Fahrbach et al. | |
| 6,691,551 | B2 | * | 2/2004 | Otaki et al. | 73/9 |
| 6,698,293 | B2 | * | 3/2004 | Reinisch et al. | 73/663 |
| 6,754,603 | B2 | * | 6/2004 | Turbett et al. | 702/113 |
| 6,923,049 | B2 | * | 8/2005 | Fujii et al. | 73/114.15 |

(Continued)

FOREIGN PATENT DOCUMENTS

DE 3601708 7/1987

(Continued)

*Primary Examiner* — Freddie Kirkland, III
(74) *Attorney, Agent, or Firm* — Warn Partners, P.C.

(57) ABSTRACT

The invention relates to a method for measuring the uniformity of the moments of shiftable friction clutch systems, the individual friction clutch system comprising an adapter at the input end and at least one adapter at the output end, as well as a system for measuring the uniformity of the moments of shiftable friction clutch systems. According to the invention, the friction clutch system is inserted into a measuring apparatus encompassing at least one moment measuring device. The clutch plates that transmit the driving power in a frictionally engaged manner are pressed against each other by means of a test force. The driving motor is driven at a certain test speed. The torque of the driving motor transmitted by means of the friction clutch system is measured within a certain interval with the aid of the moment measuring device. The inventive test method and measuring apparatus developed for a friction clutch system allow the friction clutch system to be measured and tested before the same is mounted on a transmission.

32 Claims, 3 Drawing Sheets

U.S. PATENT DOCUMENTS

| | | | |
|---|---|---|---|
| 7,654,135 B2 * | 2/2010 | DeMarco | 73/115.02 |
| 2002/0023483 A1 * | 2/2002 | Reinisch et al. | 73/116 |
| 2002/0189320 A1 * | 12/2002 | Otaki et al. | 73/9 |
| 2005/0126272 A1 | 6/2005 | Fujii et al. | |

FOREIGN PATENT DOCUMENTS

| | | |
|---|---|---|
| EP | 0493840 | 7/1992 |
| GB | 2223076 | 3/1990 |
| JP | 56098631 | 8/1981 |

* cited by examiner

MEASUREMENT OF TORQUE UNIFORMITY IN MULTIPLATE CLUTCHES

This application is a National Stage of International Application No. PCT/EP2006/012332, filed Dec. 20, 2006. This application claims priority to German Patent Application No. 10 2006 060 922.0, filed on Dec. 20, 2006 and German Patent Application No. 10 2005 062 413.8, filed on Dec. 23, 2005. The disclosures of the above applications are incorporated herein by reference.

FIELD OF THE INVENTION

The invention relates to a method for measuring the torque uniformity of shiftable friction clutch systems, with the individual friction clutch system having a drive-input-side adapter and at least one drive-output-side adapter, and to a measuring system for measuring the torque uniformity of shiftable friction clutch systems.

BACKGROUND OF THE INVENTION

DE 199 34 486 A1 discloses a method for testing an automatic transmission including its shift elements. For this purpose, the entire transmission with the mounted clutches and the brakes are placed onto a test bed and driven with a low level of power. The drive output is simulated with a torque measuring hub.

It is the object of the present invention to develop a measuring method and a measuring system for a friction clutch system by means of which the friction clutch system can be measured and tested before it is mounted in a transmission.

The above noted object is achieved by means of the features of the main claim. According to the claim, the friction clutch system is inserted into a measuring device, with the measuring device holding the drive-input-side adaptor by means of a first holding device and engaging around a drive-output-side adapter by means of a further holding device. One of the holding devices is connected to a drive motor. The measuring device comprises at least one torque measuring device. The clutch plates, which transmit the drive force in a frictionally engaging manner, are pressed against one another by means of a preload device which generates a test force. The drive motor is driven at a test rotational speed. Within a time interval, the torque of the drive motor which is transmitted by means of the friction clutch system is measured by means of the torque measuring device.

The measuring system for measuring the torque uniformity comprises at least one measuring device. The individual measuring device comprises at least two holding devices. One of the holding devices of the respective measuring device is connected to a drive motor. Furthermore, the individual measuring device comprises a torque measuring device and a preload device for the opposite loading of the two holding devices.

Further details of the invention can be gathered from the subclaims and from the following description of schematically illustrated embodiments.

DETAILED DESCRIPTION OF THE INVENTION

Figure 1:
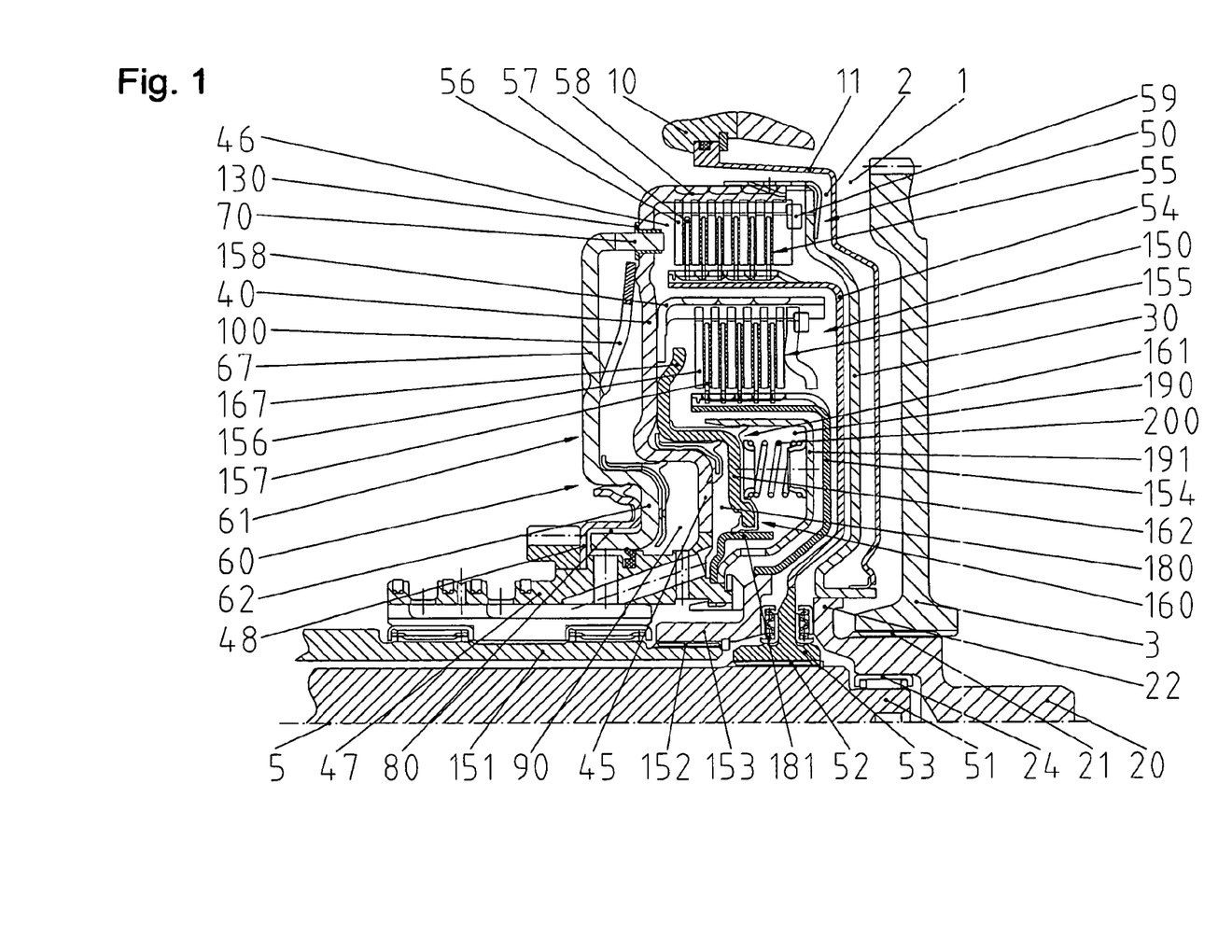
FIG. 1 is a partial sectional view of a dual-shaft clutch in a preferred embodiment of the present invention.

FIG. 1 illustrates, as an example of a shiftable clutch system 300, a dual-shaft clutch 300 of a motor vehicle. The dual-shaft clutch comprises two liquid-lubricated friction clutches 50, 150. The force-fitting shift clutches have two friction packs 55, 155 arranged radially in series. Accordingly, the first friction pack 55 is situated on a larger radius than the second friction pack 155. The two clutches 50, 150 are closed hydraulically. The release of the individual clutches 50, 150 takes place by means of spring elements and/or hydraulically by means of corresponding cylinder-piston units. The spring elements 100, 200 are for example mechanical springs such as coil springs and/or diaphragm springs. The clutch 300 is generally used in passenger vehicles.

The clutch 300 is positioned for example between a multi-shaft shift transmission and the drive motor of the vehicle. The drive motor is generally a spark-ignition or diesel engine. A single- or dual-mass flywheel 3 is often mounted between the drive motor and the clutch system.

The torque passes from the crankshaft to the flywheel 3, (See FIG. 1). The latter is seated by means of a rotationally rigid shaft-hub connection 21 on the clutch input shaft 20. Downstream of the shaft-hub connection 21, the clutch input shaft 20 widens so as to form a driver disk seat 22. The driver disk 30 is fastened to the driver disk seat 22.

The driver disk 30 which is for example deep-drawn is rotationally rigidly connected to an outer plate carrier 40. The latter has two annular plate carrying sections 58 and 158. The outer plate carrier 40, which is a sheet metal part produced for example in a punching and deep-drawing process, is fastened to a main hub 47. The combination of the clutch input shaft 20, driver disk 30, outer plate carrier 40 and main hub 47 rotates at the motor rotational speed. The parts 20, 30, 40, 47 are situated—in the exemplary embodiment—in permanent engagement with the crankshaft of the drive motor.

The clutch input shaft 20 has a central bore 24 in which a first transmission input shaft 51 is mounted by means of rolling bearings. A first plate carrier flange 53 is arranged on the transmission input shaft 51 by means of a shaft-hub connection 52. A first pot-shaped plate carrier 54 is welded to the plate carrier flange 53. The plates 56, 57 of the first clutch 50 are arranged between the first plate carrier 54 and the outer plate carrying section 58 of the outer plate carrier 40. Here, the outer plates 56 engage in a form-fitting manner into the profiling of the outer plate carrying section 58. The outer plates 56 are mounted in a rotationally rigid yet longitudinally displaceable manner on the plate carrying section 58. The inner plates 57 which are seated between the outer plates 56 are connected in a similar way to the profiling of the first inner plate carrier 54.

The outer plate carrier 40 forms, together with the main hub 47, an annular cylinder 45. As per FIG. 1, a cylinder outer wall 48, which is substantially U-shaped in partial cross section, is rigidly arranged on the main hub 47 so as to be offset laterally to the left with respect to the annular cylinder 45. A first annular piston 61 which is formed from a deep-drawn metal sheet is arranged between the cylinder outer wall 48 and the annular cylinder 45. The annular piston 61 has a piston section 62 and a force transmission section 67. A first working space 80 is situated between the piston section 62 and the cylinder outer wall 48.

The working space 80 is acted on with pressurized oil in order to press the force transmission section 67 against the first plate pack 55. For this purpose, the force transmission section 67 engages by means of tongues 70 into the interior space 46 of the outer plate carrier 40. When the first clutch 50 is actuated, the tongues 70 press the plate pack 55 against a stop 59 which is fixed in the outer plate carrier 40. In the engaged state, the clutch input shaft 20 is connected by means of the outer plate carrier 40 and the first inner plate carrier 54 to the first transmission input shaft 51. One of the gearwheels which is arranged on the shaft 51 then meshes in a force-transmitting manner with a gearwheel on the transmission output shaft. The gearwheels and the transmission output shaft are not illustrated in FIG. 1.

A diaphragm spring 100 is positioned between the force transmission section 67 and the outer plate carrier 40 as a restoring element. The diaphragm spring 100 releases the force transmission section 67 from the first plate pack 55 when the first working space 80 is relieved of pressure.

A second transmission input shaft 151 is mounted, for example by means of two needle-roller bearings, in the main hub 47. The transmission input shaft 151, which is embodied as a hollow shaft, surrounds the first transmission shaft 51 at least in regions. Situated at the front shaft end—which is aligned toward the clutch input shaft 20—is a shaft-hub connection 152, by means of which a second plate carrier flange 153 is rotationally rigidly arranged on the second transmission input shaft 151. The inner plate carrier 154 of the second clutch 150 is fastened to the plate carrier flange 153.

Arranged between the second inner plate carrier 154 and the first inner plate carrier 54 is a second inner plate carrying section 158. The inner plate carrying section is welded to the outer plate carrier 40. The second inner plate carrier 154 and the outer plate carrier 40 fix the second plate pack 155 in a known way.

Arranged within the installation space of the second inner plate carrier 154 is a compensating space delimiting wall 191, which is fastened to the main hub 47. The delimiting wall 191 has the shape of an annular duct which surrounds the second compensating space 190 on three sides.

Arranged between the compensating space 190 and the outer plate carrier 40 is a second annular piston 161. The annular piston 161 which is divided into a piston section 162 and an actuating section 167 presses—during engagement—with the actuating section 167 against the second plate pack 155.

The piston section 162 closes off a second working space 180 which is formed by the outer plate carrier 40 and a cylinder ring 181. The second working space 180 is in this case sealed off with respect to the two components 40, 181 by means of lip seal rings. The piston section 62 of the first annular piston 61 has similar seals. The cylinder ring 181 is likewise fastened to the main hub 47. The annular piston 161 is also sealed off with respect to the compensating space 190.

If the second clutch 150 is actuated, as the first clutch 50 opens, the outer plate carrier 40 is connected to the second inner plate carrier 154. The motor torque is thereby transmitted to the second transmission input shaft 151. Corresponding gearwheels transmit the rotational movement, with an altered torque, to the transmission output shaft (not illustrated) which drives the drivetrain.

A plurality of spring elements 200, for example in the form of coil pressure springs, are arranged in the second compensating space 190. The spring elements 200 are supported between the second annular piston 161 and the delimiting wall 191. The annular piston 161 is raised from the corresponding friction pack 155, inter alia by means of the spring elements 200, as the second clutch 150 is released.

The individual components of the dual-shaft clutch 300 are initially produced separately and are subsequently assembled. The assembly takes place for example at individual, separate workstations or along a production line with a plurality of stations and automated workpiece transportation. Here, for example, proceeding from a basic assembly, individual components are automatically or semi-automatically mounted, and if appropriate secured, at the different stations.

Even if all the individual parts are produced within the permissible tolerances, deviations can result from the sum of the production and assembly tolerances, which deviations influence the operating properties of the friction clutch system 300.

For example, if the concentricity of the outer plate carriers 40, 140 differs from one another, the pressure piston seals are loaded non-uniformly. This can bring about a non-uniform movement for example of the piston 61 and thereby cause a non-uniform plate pressing force.

The plates 56, 57; 156, 157 of the friction packs 55, 155 can have unevennesses. This can lead to a variation of the pressing force, and therefore to a fluctuation of the torque which can be transmitted by means of the dual-shaft clutch 300, during a revolution of the dual-shaft clutch 300.

A further influential factor can be a non-circularity of the groove for the stop ring 59. This can cause non-uniform contact of the plate pack 55.

Such deviations which are listed by way of example can, individually or in combination, influence the operating properties of the friction clutch 300. The deviations result for example in a non-uniformity of the torque transmitted by means of the friction clutch system 300 for example from the crankshaft via the clutch input shaft 20 to the respective transmission input shaft 51; 151. Here, the amplitudes and the period length of the fluctuation of the torque over a revolution or over a time interval are measures of the torque uniformity.

Figure 2:
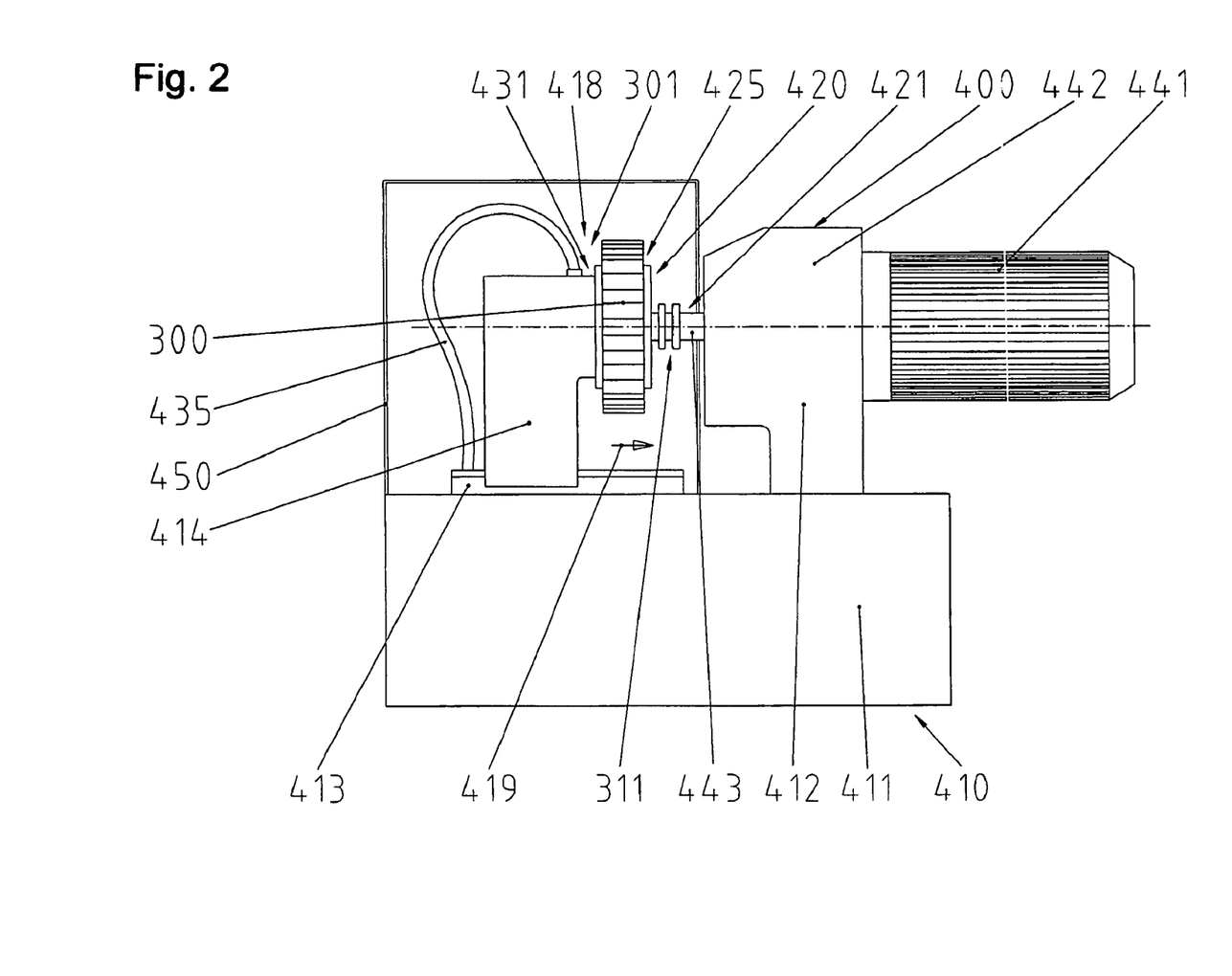
FIG. 2 is a schematic view of a manually-actuated clutch measuring machine in a preferred embodiment of the present invention.

In order to measure the torque uniformity, the assembled friction clutch system 300 is tested and measured by means of a measuring system 400. For this purpose, the friction clutch system 300 is inserted into a measuring device 420 of a measuring machine 410. The measuring machine 410 of this type is illustrated in FIG. 2. The measuring machine 410 comprises for example a frame 411 having a machine pedestal 412 and a workpiece carriage 414 which is displaceable on a guide 413.

The machine pedestal 412 can be fixedly or detachably connected to the frame 411. A machine pedestal 412 which is movable on the frame 411 is also conceivable. In this exemplary embodiment, the machine pedestal 412 supports a drive motor 441 and for example a transmission 442 (not illustrated in any more detail here) with a fixed transmission ratio. The output shaft 443 of the transmission 442 supports a holding device 421.

The guide 413 is in this exemplary embodiment a longitudinal guide, for example in the design of a flat guide. The guide direction 419 is aligned parallel to the longitudinal edge of the frame 411 and to the shaft of the drive motor 441.

The workpiece carriage 414 can be moved along the guide 413 manually or by means of a drive. The position of the workpiece carriage 414 on the guide 413 can be secured for example by means of a clamping device. The workpiece carriage 414 supports a second holding device 431 which is aligned here with the first-mentioned holding device 421. The holding device 431 is in this exemplary embodiment connected by means of a plurality of hydraulic lines 435, of which only one is illustrated in FIG. 2, to the frame 411. Also arranged on the workpiece carriage 414, which in this case forms a rigid longitudinal stop 418, is for example a torque measuring device which is not illustrated in FIG. 2. The torque measuring device comprises for example a load cell. In order to transmit the torque of the clutch 300, the holding device 431 is for example connected by means of a rotary leadthrough to a lever which acts on the load cell.

In the illustration of FIG. 2, a clutch system 300 is inserted into the measuring device 420. Here, for example the clutch input shaft 20, which in this case forms a drive-input-side adapter 301 of the clutch system 300, is seated in the carriage-side holding device 431. The hydraulic connections of the clutch system 300 are for example hydraulically connected to the lines 435.

The transmission input shafts 51; 151, the drive-output-side adapter 311 of the clutch system 300, are seated in the pedestal-side holding device 421. The clutch system 300 can of course also be inserted into the measuring device 420 in such a way that the transmission input shafts 51; 151 are seated in the carriage-side holding device 431 and the clutch input shafts 20 are arranged in the pedestal-side holding device 421.

In order to insert the clutch system 300 into the measuring device 420, the workpiece carriage 414 is for example moved to the left in the illustration of FIG. 2. The clutch system 300 is now inserted into the measuring device 420 by hand, by means of a handling device etc., in such a way that for example the clutch axis 5 is aligned with the axes of the holding devices 421, 431. The workpiece carriage 414 is subsequently moved to the right in the illustration of FIG. 2 and is secured for example by applying the clamping device. Here, for example, the hydraulic connections are made between the clutch system 300 and the holding adapter 431. The spray guard 450 is subsequently closed.

In order to measure the torque uniformity, a lubricating oil flow with for example 3 liters per minute is for example firstly activated. Here, the friction faces 56, 57; 156, 157 of the clutch system 300 are wetted. The clutch system 300 is subsequently closed by means of the hydraulics of the measuring device 420. The closing function can also take place pneumatically. Here, for example, the friction faces 55, 56 of the first friction clutch 50 of the clutch system 300 are firstly pressed against one another by means of a preload device which generates a constant force at least during the measurement. The force is for example is set such that the torque which can be transmitted between the friction faces 55, 56 of the friction clutch 50 is between 10 and 100 Newton meters. The torque, in one example, is set to 30 Newton meters for the measurement. The torque which can be transmitted is calculated from the product of the pressing force, the number of friction faces, the mean friction radius and the friction coefficient.

The drive motor 441 is now activated, such that for example the output shaft 443 of the transmission 442 of the drive motor 441—and therefore the first holding device 421—has a rotational speed of from 1 to 1000 revolutions per minute. The rotational speed is constant during the measurement.

The torque which is applied to the friction clutch 50 can be determined by means of a load cell, measuring flange or measuring shaft.

The measurement by means of the described measuring system 400 is carried out in this exemplary embodiment during a time interval of for example 90 seconds. Here, the force profile—and on account of the lever arm of constant length, also the torque profile—over time are measured in a computer-aided manner. The measurement results in a torque profile with maxima and minima. The torque profile can be periodic.

The repetition frequency of the maxima and minima can be determined from the torque profile for example by means of a Fourier analysis. Here, the first-order maxima are for example the maxima with the highest amplitude, and the higher-order maxima are for example maxima of lower amplitude. The Fourier analysis takes place for example in a computed-aided manner during the measuring interval. Instead of a complete Fourier analysis, it is possible, for example in order to reduce the data quantity to be processed, to carry out a so-called fast Fourier transformation.

The amplitude of the torque signal over the frequency—the result of the Fourier analysis—is for example a classification feature of the measured friction clutch 50. The lower the amplitudes are, the more uniform the torque profile is. A friction clutch 50 with low amplitudes is classified for example as a very good clutch 50, a clutch 50 with high amplitudes is classified for example as a poor clutch 50.

The workpiece carriage 414 can also comprise a brake motor which has for example an output rotational speed of from 0.01 rev/min to 1 rev/min. The torque difference between the drive input torque and drive output torque is then for example determined during the measurement of torque uniformity. The measurement can take place at the drive input side or drive output side.

By means of the method, it is also possible to determine the torque uniformity of the second friction clutch 150 of the dual-shaft clutch 300.

After the measurements, the hydraulic supply lines are for example shut off and the residual oil is centrifuged out at high rotational speed.

The removal of the measured clutch system 300 from the measuring device 420 takes place in the reverse sequence to the insertion. Depending on its classification, the clutch system 300 can be supplied to the further flow of material.

Figure 3:
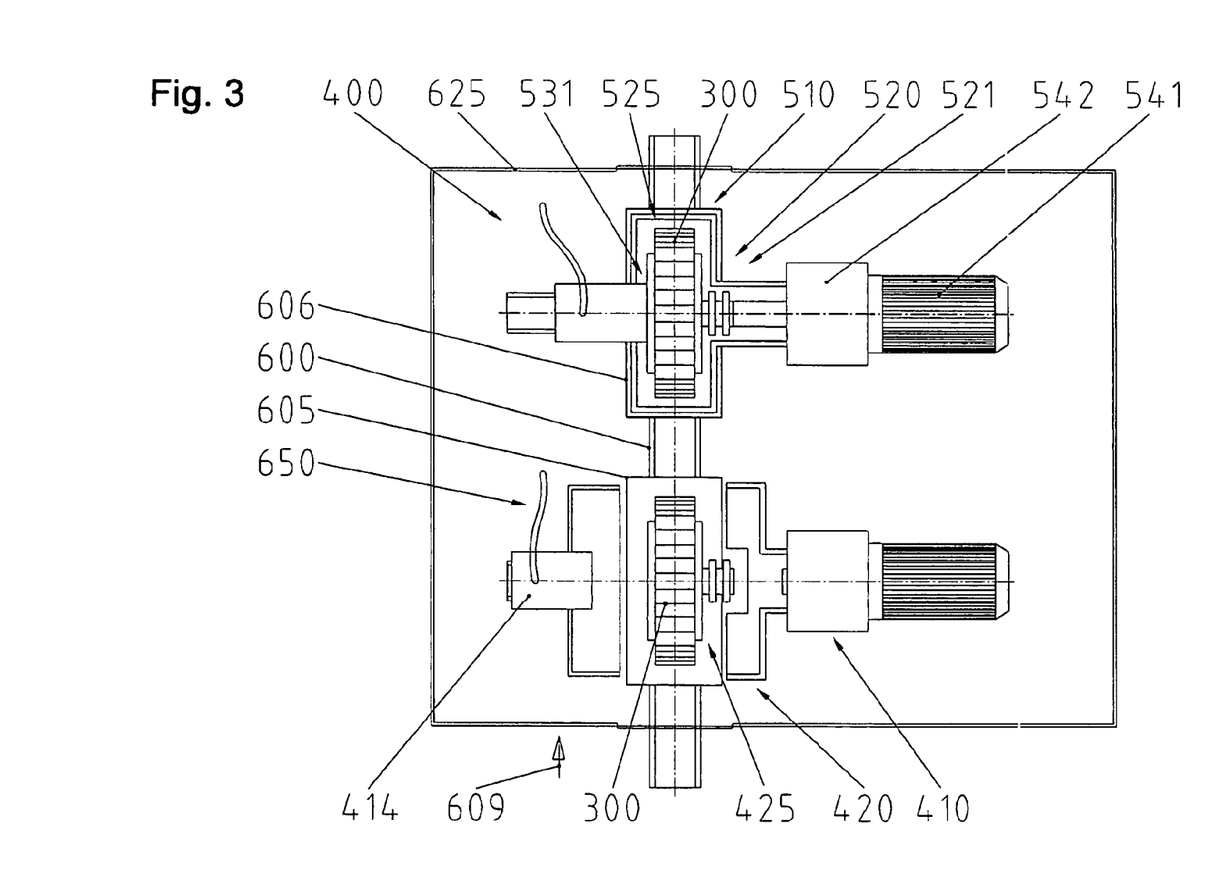
FIG. 3 is a top plan view of an automated measuring system in a preferred embodiment of the present invention.

The measuring device 420 can advantageously be incorporated into an automated production line. The clutch system 300 which is fully assembled at individual stations of a production line of the type is conveyed by means of a workpiece supply device 600 into a test region 650 for torque uniformity.

FIG. 3 shows a plan view of a test region 650 with a measuring system 400 which has two measuring machines 410, 510 with in each case one measuring device 420, 520. The main components of the measuring machines 410, 510 and of the measuring devices 420, 520 are at least of similar construction to the components of the measuring machine 410 and the measuring device 420 illustrated in FIG. 2.

In the illustration of FIG. 3, the workpiece supply device 600 conveys the clutch systems 300 on workpiece carriers 605, 606 from bottom to top. In order to convey the workpiece carriers 605, 606 into the test region, the spray guard 625 is initially opened. The workpiece carriages 414 of the measuring machines 410, 510 are in a rear rest position. The workpiece carrier 605, with a clutch system 300, which is situated in front in the conveying direction 609 is conveyed into the working space 525 of the measuring device 520 which is situated downstream in the conveying direction 609. The workpiece carrier 606 which is situated behind in the conveying direction 609 is conveyed into the working space 425 of the measuring device 420.

Once the workpiece carriers 605, 606 have reached the positions, the workpiece carriers 605, 606 are for example raised by means of a lifting device (not illustrated here). The position of the raised clutch 300 in the working space 425 is illustrated for example in the lower measuring device 420 of FIG. 3. Once the clutch axis 5 coincides with the central axes of the holding devices 421, 431, the workpiece carriage 414 moves in the direction of the machine pedestal 412. The clutch 300 is held by the two holding devices 421, 431. The workpiece carrier 605, which can if appropriate also be moved in the transverse direction with respect to the conveying direction 609, can thereafter be lowered. A clutch system 300 which is inserted into the measuring device 520 is illustrated for example in the upper measuring device 520 of FIG. 3. As the clutch system 300 is inserted, the hydraulic connections are for example also made.

The measuring devices 420, 520 can also comprise brake motors.

The measurement and the evaluation of the torque uniformity takes place for example as described in connection with FIG. 2. The drag torque can also be determined as described by means of the automated measuring system 400.

The two measuring devices 420, 520 described here can be connected to the same evaluating device. The evaluating device is in turn for example connected in a data-exchanging manner to a production central computer.

The removal of the clutches 300 from the measuring devices 420, 520 takes place in the reverse sequence to their insertion. Once the clutches 300 are resting on the workpiece carriers 505, 506, the latter are conveyed out of the test region 650 in the conveying direction 609 after the spray guard 625 is opened.

Instead of the dual-shaft clutch 300 described here, it is also possible for a single shaft clutch to be measured and tested.

In a series production process, it is possible by means of the method according to the invention and the measuring system for all of the series-produced clutches to be measured for torque uniformity. The measured torque uniformity is then compared with a torque uniformity limit value and, in the event of the limit value being exceeded, the clutches are correspondingly overhauled, and thereafter re-measured, or else are removed from the series production process. As a particular advantage, it is ensured by means of the method that all the clutches which leave the series production line reliably adhere to predefined specifications with regard to torque uniformity (100% inspection).

LIST OF REFERENCE SYMBOLS

1 Dry space; transmission region; dry
2 Transmission wet space
3 Dual-mass flywheel, flywheel
5 Rotational axis of the clutch system
10 Transmission housing, housing bell
11 Partition
20 Clutch input shaft
21 Shaft-hub connection
22 Driver disk seat
24 Bore, central
30 Driver disk
39 Spacing between (55) and (41)
40 First outer plate carrier, clutch component
41 Inner wall of (40)
42 Outer wall of (40)
43 Bead, bead elevation
44 Central line
45 Annular cylinder
46 Interior space
47 Main hub
48 Cylinder outer wall
49 Recesses for (70)
50 First friction clutch, clutch
51 First transmission input shaft
52 Shaft-hub connection
53 First plate carrier flange
54 First inner plate carrier
55 Plate pack
56 Outer plates, clutch parts
57 Inner plates, clutch parts
58 Plate carrying section, outer
59 Stop, stop ring
60 First actuating element
61 First annular piston, piston, pressure piston
62 Piston section
67 Force transmission section
70 Tongues
71 Tongue end face
73 Tongue length
74 Central line
75 Gap
76 Gap base
79 Circle on which (44) and (74) lie
80 First working space
90 First compensating space
99 Rear space
100 Diaphragm spring, plate spring, restoring element
130 Recess reinforcement, clip
131 Tube section
132 Flange ring section
133 Latching hook
140 Casing, sleeve
144 Bore
145 Chamfer
146 Internal corner roundings
150 Second friction, clutch
151 Second transmission input shaft
152 Shaft-hub connection
153 Second plate carrier flange
154 Second inner plate carrier
155 Plate pack
156 Outer plates, clutch parts
157 Inner plates, clutch parts
158 Plate carrying section, inner
160 Second actuating element
161 Second annular piston, piston, compensating piston
162 Piston section
167 Actuating section
180 Second working space
181 Cylinder ring
190 Compensating space
191 Compensating space delimiting wall
200 Spring elements, restoring springs, coil springs
300 Friction clutch system, dual-shaft clutch
301 Drive-input-side adapter
311 Drive-output-side adapter
400 Measuring system
410 Measuring machine
411 Frame
412 Machine pedestal
413 Guide
414 Workpiece carriage
418 Longitudinal stop
419 Guide direction
420 Measuring device
421 Holding device
425 Working space
431 Holding device
435 Hydraulic lines 441 Drive motor
442 Transmission
443 Output shaft of (442)
450 Spray guard
510 Measuring machine
520 Measuring device
521 Holding device
525 Working space
531 Holding device
541 Drive motor
542 Transmission
600 Workpiece supply device
605 Workpiece carrier
606 Workpiece carrier
609 Conveying direction
625 Spray guard
650 Test region

The invention claimed is:

1. A method for measuring the torque uniformity of shiftable friction clutch systems, with the individual friction clutch system having a drive-input-side adapter and at least one drive-output-side adapter comprising:
   inserting into a measuring device a friction clutch system;
   with the measuring device holding the drive-input-side adaptor by means of a first holding device;
   engaging around a drive-output-side adapter by means of a further holding device;
   in that one of the holding devices is connected to a drive motor;
   in that the measuring device comprises at least one torque measuring device;
   in that the clutch plates which transmit the drive force in a frictionally engaging manner, are pressed against one another by means of a preload device which generates a test force;
   in that the drive motor is driven at a test rotational speed; and
   in that, within a time interval, the torque of the drive motor which is transmitted by means of the friction clutch system is measured by means of the torque measuring device and wherein a repetition frequency of the torque fluctuations over the time interval is determined as a function of the rotational speed of the drive motor and wherein the determination of the repetition frequency takes place in a computer-aided manner by means of a Fourier analysis.

2. The method as claimed in claim 1, wherein the measuring device comprises a brake motor which is arranged on the holding device which faces away from the drive motor.

3. The method as claimed in claim 1, wherein the determination of the repetition frequency takes place during a measurement interval.

4. The method as claimed in claim 1, wherein a measured clutch systems are classified according to a determined amplitude of the determined frequency values.

5. The method as claimed in claim 1, wherein the drive-input-side adapter of the friction clutch system comprises a clutch input shaft and in that each drive-output-side adapter of the friction clutch system comprises a transmission input shaft.

6. A method for measuring the torque uniformity of shiftable friction clutch systems, with the individual friction clutch system having a drive-input-side adapter and at least one drive-output-side adapter comprising:
   inserting into a measuring device a friction clutch system;
   with the measuring device holding the drive-input-side adaptor by means of a first holding device;
   engaging around a drive-output-side adapter by means of a further holding device;
   in that one of the holding devices is connected to a drive motor;
   in that the measuring device comprises at least one torque measuring device;
   in that the clutch plates which transmit the drive force in a frictionally engaging manner, are pressed against one another by means of a preload device which generates a test force;
   in that the drive motor is driven at a test rotational speed; and
   in that, within a time interval, the torque of the drive motor which is transmitted by means of the friction clutch system is measured by means of the torque measuring device and wherein the measuring device comprises a brake motor which is arranged on the holding device which faces away from the drive motor.

7. The method as claimed in claim 6, wherein a repetition frequency of the torque fluctuations over the time interval is determined as a function of the rotational speed of the drive motor.

8. The method as claimed in claim 7, wherein the determination of the repetition frequency takes place in a computer-aided manner by means of a Fourier analysis.

9. The method as claimed in claim 8, wherein a determination of the repetition frequency takes place during the measurement interval.

10. The method as claimed in claim 8, wherein a measured clutch systems are classified according to a determined amplitude of a determined frequency values.

11. The method as claimed in claim 6, wherein the friction clutch system is a dual-shaft clutch.

12. The method as claimed in claim 6, wherein the drive-input-side adapter of the friction clutch system comprises a clutch input shaft and in that each drive-output-side adapter of the friction clutch system comprises a transmission input shaft.

13. The method as claimed in claim 6, wherein the friction clutch system is conveyed to the measuring device by means of a workpiece supply device.

14. The method as claimed in claim 13, wherein the friction clutch system is raised into the measuring device by means of a lifting device.

15. The method as claimed in claim 14, wherein the measuring device is arranged in a test region in which two measuring devices are arranged in series in the conveying direction of the workpiece supply device.

16. The method as claimed in claim 6, wherein the test force between the clutch plates generates a torque of between 10 and 100 Newton meters.

17. The method as claimed in claim 6, wherein the rotational speed of the output shaft of a transmission of the drive motor is between 1 rev/min and 1000 rev/min.

18. The method as claimed in claim 17, wherein the other holding device is connected with a brake motor and wherein the rotational speed of the brake motor is between 0.1 rev/min and 1 rev/min.

19. The use of the method as claimed in claim 6 for measuring the torque uniformity of a wet-running clutch, a starting clutch or a dual-shaft clutch.

20. The use of the method as claimed in claim 6 for testing the torque uniformity of friction clutch systems produced in a series-production process.

21. The use as claimed in claim 20, wherein, during the test, the torque uniformity measured with the produced friction clutch system is compared with a torque uniformity limit value.

22. A method for measuring the torque uniformity of shiftable friction clutch systems, with the individual friction clutch system having a drive-input-side adapter and at least one drive-output-side adapter comprising:
   inserting into a measuring device a friction clutch system;
   with the measuring device holding the drive-input-side adaptor by means of a first holding device;
   engaging around a drive-output-side adapter by means of a further holding device;
   in that one of the holding devices is connected to a drive motor;
   in that the measuring device comprises at least one torque measuring device;
   in that the clutch plates which transmit the drive force in a frictionally engaging manner, are pressed against one another by means of a preload device which generates a test force;
   in that the drive motor is driven at a test rotational speed;
   in that, within a time interval, the torque of the drive motor which is transmitted by means of the friction clutch system is measured by means of the torque measuring device; and
   wherein the rotational speed of the output shaft of a transmission of the drive motor is between 1 rev/min and 100 rev/min, and wherein the other holding device is connected with a brake motor, and wherein the rotational speed of the brake motor is between 0.1 rev/min and 1 rev/min.

23. A measuring system for measuring the torque uniformity of shiftable friction clutch systems comprising:
   first and second holding devices;
   a drive motor connected to one of said holding devices;
   a torque measuring device connected to said other holding device;
   a preload device for the opposite loading of the two holding devices; and
   wherein at least one measuring device comprises a brake motor or a fixed stop.

24. The measuring system as claimed in claim 23, wherein said measuring system comprises at least one evaluating device.

25. The measuring system as claimed in claim 23, wherein the preload devices of the measuring devices are hydraulically actuated.

26. The measuring system as claimed in claim 23, wherein one holding device can hold at least two transmission input shafts, which are rotatable relative to one another, of a friction clutch system.

27. The measuring system as claimed in claim 23 wherein the measuring system comprises two measuring devices.

28. The measuring system as claimed in claim 23, wherein the workpiece fitting takes place by means of an automated workpiece supply.

29. A series production plant for friction clutch systems having at least one measuring system as claimed in claim 23.

30. The series production plant as claimed in claim 29, wherein at least one evaluating device is provided, by means of which torque uniformities determined by the at least one measuring system can be compared with a predefined torque uniformity value.

31. A measuring system for measuring the torque uniformity of shiftable friction clutch systems comprising:
   first and second holding devices;
   a drive motor connected to one of said holding devices;
   a torque measuring device connected to said other holding device; and
   a preload device for the opposite loading of the two holding devices; and
   wherein one holding device can hold at least two transmission input shafts, which are rotatable relative to one another, of a friction clutch system.

32. The measuring system as claimed in claim 31, wherein at least one measuring device comprises a brake motor or a fixed stop.

* * * * *